US008606559B2

(12) United States Patent
Jin et al.

(10) Patent No.: US 8,606,559 B2
(45) Date of Patent: Dec. 10, 2013

(54) METHOD AND APPARATUS FOR DETECTING ERRORS IN MACHINE TRANSLATION USING PARALLEL CORPUS

(75) Inventors: Yun Jin, Daejeon (KR); Oh Woog Kwon, Daejeon (KR); Ying Shun Wu, Daejeon (KR); Changhao Yin, Daejeon (KR); Sung Kwon Choi, Daejeon (KR); Chang Hyun Kim, Daejeon (KR); Seong Il Yang, Daejeon (KR); Ki Young Lee, Daejeon (KR); Yoon Hyung Roh, Daejeon (KR); Young Ao Seo, Daejeon (KR); Eun Jin Park, Daejeon (KR); Young Kii Kim, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1141 days.

(21) Appl. No.: 12/492,726

(22) Filed: Jun. 26, 2009

(65) Prior Publication Data
US 2010/0070261 A1   Mar. 18, 2010

(30) Foreign Application Priority Data
Sep. 16, 2008  (KR) ........................ 10-2008-0090595

(51) Int. Cl.
*G06F 17/28* (2006.01)
*G06F 17/20* (2006.01)

(52) U.S. Cl.
USPC ............................ 704/2; 704/4; 704/7; 704/8

(58) Field of Classification Search
USPC ....................................................... 704/2–8
See application file for complete search history.

(56) References Cited

U.S. PATENT DOCUMENTS

| 5,408,410 | A |  | 4/1995 | Kaji |
| 7,295,963 | B2 |  | 11/2007 | Richardson et al. |
| 7,333,927 | B2 |  | 2/2008 | Lee et al. |
| 7,653,531 | B2 | * | 1/2010 | Sneddon et al. ................. 704/10 |
| 2007/0250306 | A1 | * | 10/2007 | Marcu et al. ...................... 704/9 |
| 2009/0326913 | A1 | * | 12/2009 | Simard et al. ..................... 704/2 |

FOREIGN PATENT DOCUMENTS

| JP | 5-298360 | 11/1993 |
| JP | 2000-148756 | 5/2000 |
| KR | 10-2003-0056655 | 7/2003 |

OTHER PUBLICATIONS

"Rule-based Translation With Statistical Phrase-based Post-editing", Michel Simard et al., Proceedings of the $2^{nd}$ Workshop on Statistical Machine Translation pp. 203-206.

* cited by examiner

*Primary Examiner* — Angela A Armstrong
(74) *Attorney, Agent, or Firm* — Staas & Halsey LLP (57) ABSTRACT

A method for automatically detecting errors in machine translation using a parallel corpus includes analyzing morphemes of a target language sentence in the parallel corpus and a machine-translated target language sentence, corresponding to a source language sentence, to classify the morphemes into words; aligning by words and decoding, respectively, a group of the source language sentence and the machine-translated target language sentence, and a group of the source language sentence and the target language sentence in the parallel corpus; classifying by types errors in the machine-translated target language sentence by making a comparison, word by word, between the decoded target language sentence in the parallel corpus and the decoded machine-translated target language sentence; and computing error information in the machine-translated target language sentence by examining a frequency of occurrence of the classified error types.

3 Claims, 5 Drawing Sheets

CHINESE SENTENCE (401)
1. 虽然/CJ
2. 韩国/NN
3. 的/DE
4. 技术/NN
5. 竞争力/NN
6. 大幅/AD
7. 上升/VV
8. ，/PU
9. 但是/CJ
10. 科学力/NN
11. 竞争力/NN
12. 却/AD
13. 连续/AJ
14. 2/NU
15. 年/MW
16. 下降/VV
17. 。/PU

KOREAN SENTENCE BY AUTOMATIC TRANSLATION (404)
1. 한국/NN
2. 기술/NN
3. 경쟁력/NN + 이/PT
4. 비록/CJ
5. 대폭/AD
6. 상승하/VV
7. ㄹ지라도/CJ
8. ，/PU
9. 그러나/CJ
10. 과학/NN
11. 경쟁력/NN + 은/PT
12. 오히려/AD
13. 연속/AJ
14. 2/NU
15. 년/MW
16. 떨어지/VV
17. 。/PU

DECODED ALIGNMENT TABLE 2 (405)

| | | | | |
|---|---|---|---|---|
| 3 | 1 | 4 | 비록 | CJ | 0 |
| 3 | 2 | 1 | 한국 | NN | 0 |
| 3 | 3 | 3 | 0 | 0 | 0 |
| 3 | 4 | 2 | 기술 | NN | 0 |
| 3 | 5 | 3 | 경쟁력 | NN | 이 |
| 3 | 6 | 5 | 대폭 | AD | 0 |
| 3 | 7 | 6 | 상승하 | VV | 0 |
| 3 | 8 | 8 | ， | PU | 0 |
| 3 | 9 | 7 | ㄹ지라도 | CJ | 0 |
| 3 | 9 | 9 | 그러나 | CJ | 0 |
| 3 | 10 | 10 | 과학 | NN | 0 |
| 3 | 11 | 11 | 경쟁력 | NN | 은 |
| 3 | 12 | 12 | 오히려 | AD | 0 |
| 3 | 13 | 13 | 연속 | AJ | 0 |
| 3 | 14 | 14 | 2 | NU | 0 |
| 3 | 15 | 15 | 년 | MW | 0 |
| 3 | 16 | 16 | 떨어지 | VV | 0 |
| 3 | 17 | 17 | 。 | PU | 0 |

METHOD AND APPARATUS FOR DETECTING ERRORS IN MACHINE TRANSLATION USING PARALLEL CORPUS

CROSS-REFERENCE(S) TO RELATED APPLICATION(S)

The present invention claims priority of Korean Patent Application No. 10-2008-0090595, filed on Sep. 16, 2008, which is incorporated herein by reference.

FIELD OF THE INVENTION

The present invention relates to a method and apparatus that automatically detect and trace errors in a machine translation system, and, more particularly, to a method and apparatus that automatically detect machine translation errors using a parallel corpus to efficiently enhance the performance of translation in a rule-based machine translation system.

BACKGROUND OF THE INVENTION

With the recent increase of international exchange, use of machine translation which contributes to exchange between different languages is also increasing. In such machine translation, improving the accuracy of the machine translation is an important issue.

Two methods have mainly been used to improve the performance of the conventional machine translation system: one is to expand massive domain knowledge; and the other is to post-edit the result translated by a machine translation system.

The method to expand massive domain knowledge continuously expands the domain knowledge to be used in the machine translation system. In order to attain automatic translation of high quality in a specific domain, in particular, it is necessary not only to newly construct the knowledge that is appropriate to the domain but also to specialize the pre-constructed knowledge and the translation system to make them appropriate for the domain, for which specialized operations such as construction of coined words and patterns, engine error tuning, correction of pre-constructed knowledge and the like are required. These operations are carried out in general by trained linguists who are bilingual. This method is limited by the difficulty of making such bilinguists available as well as by the amount of time necessary to read a great amount of translated sentences Therefore, a great deal of time and cost are required to obtain a high quality translation in the specific domain, implying that the efficiency of translation is greatly reduced.

The post-editing method post-edits the result given by a machine translation system to overcome the shortcomings of the translation system. This method performs a statistical machine translation (hereinafter referred to as SMT) using a great number of parallel corpora, and the outcome of SMT is used to post edit the result translated by the conventional machine translation system.

The outcome of SMT is used not for improving the performance of a rule-based machine translation system but for obtaining more accurate translation by correcting the errors in the translated result. Hence, the corrected result does not alleviate the problems in the rule-based machine translation system. In addition, using such SMT result is not sufficient to resolve the internal problems that arise when the rule-based machine translation system is applied to a new domain.

SUMMARY OF THE INVENTION

In view of the above, the present invention provides a method and apparatus for detecting errors, using a parallel corpus, in machine translation, which detect translation errors in a rule-based machine translation system and provide statistical information of the errors classified by types, thereby improving performance of the machine translation system.

In accordance with an aspect of the present invention, there is provided a method for automatically detecting errors in machine translation using a parallel corpus, including:

analyzing morphemes of a target language sentence in the parallel corpus and a machine-translated target language sentence, corresponding to a source language sentence, to classify the morphemes into words;

aligning by words and decoding, respectively, a group of the source language sentence and the machine-translated target language sentence, and a group of the source language sentence and the target language sentence in the parallel corpus;

classifying by types errors in the machine-translated target language sentence by making a comparison, word by word, between the decoded target language sentence in the parallel corpus and the decoded machine-translated target language sentence; and computing error information in the machine-translated target language sentence by examining a frequency of occurrence of said classified error types.

In accordance with another aspect of the present invention, there is provided an apparatus for automatically detecting errors in machine translation using a parallel corpus, comprising:

a morphemic analysis unit for analyzing morphemes of a target language sentence in the parallel corpus and a machine-translated target language sentence which correspond to a source language sentence and classifying the morphemes into words;

a word alignment unit for aligning respectively by words and decoding a group of the source language sentence and the machine-translated target language sentence, and a group of the source language sentence and the target language sentence in the parallel corpus;

an error detection unit for detecting errors in the machine-translated target language sentence by making a comparison, word by word, between the decoded target language sentence in the parallel corpus and the decoded machine-translated target language sentence; and an error analysis unit for classifying by types errors in the machine-translated target language sentence detected by the error detection unit and computing error information by examining a frequency of occurrence for each error type.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
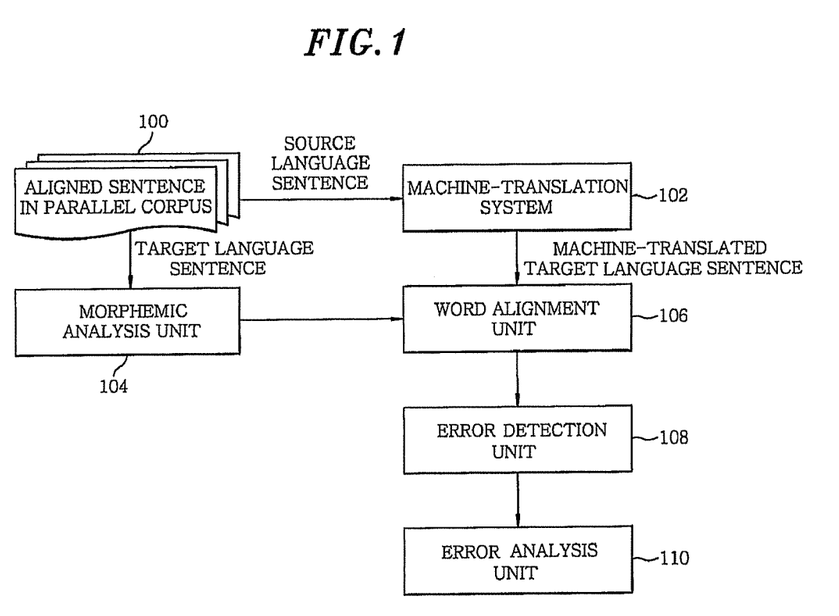
FIG. 1 shows a block diagram of an error detection apparatus that automatically detects errors in a machine translation system that uses a parallel corpus in accordance with an embodiment of the present invention.

FIG. 1 shows a block diagram of an error detection apparatus that automatically detects errors in a rule-based machine translation system, using a parallel corpus in accordance with an embodiment of the present invention.

In the following, operations in respective components of the error detection apparatus that automatically detects errors in a rule-based machine translation system will be explained in detail.

To begin with, it is assumed that a source language which needs to be translated is Chinese and a target language to be generated by translation is Korean. A morphemic analysis unit 104 analyzes morphemes in a sentence in the target language, Korean sentence, corresponding to that of in a source language among the sentences in the parallel corpus aligned by sentences.

A machine translation system 102 translates a source language sentence among the sentences within the parallel corpus aligned by sentences into a target language sentence using automatic machine translation. A word alignment unit 106 aligns word by word a group of the source language sentence and the target language sentence obtained by the machine translation system 102, and a group of the source language sentence and the target language sentence within the parallel corpus.

An error detection unit 108 decodes the target language sentence aligned in words into a form in which errors can be detected and makes horizontal and vertical comparisons of the target language sentence within the parallel corpus and the machine-translated target language sentence using the decoded information so as to detect the errors.

An error analysis unit 110 classifies by types the errors in the machine-translated target language sentence detected in the error detection unit 108, calculates the occurrence frequency of the errors, and analyzes the errors and performance such as error weights in the machine translation system 102. The analysis results are then provided to engineers so that they can be used afterwards as statistical information to improve the performance in the machine translation system 102.

Figure 2:
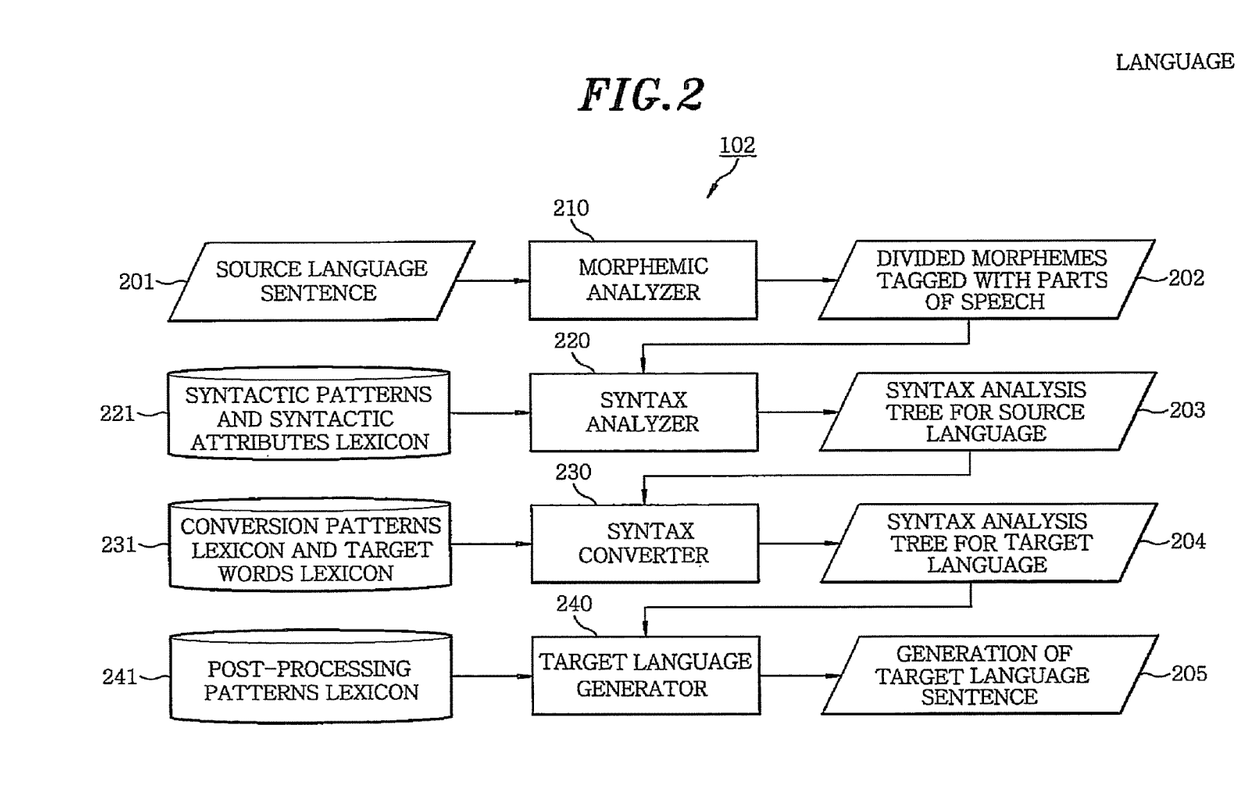
FIG. 2 shows a detailed block diagram of the machine translation system shown in FIG. 1.

FIG. 2 shows a detailed block diagram of the rule-based machine translation system 102 illustrated in FIG. 1.

In the first place, the rule-based machine translation system 102 carries out morphemic analysis of the source language sentence 201 in a morphemic analyzer 210. Here, the morphemic analyzer 210 is dependent upon the source language. If the source language is Chinese as in one example, the morphemic analyzer first segments a sentence and then tags a part of speech to each of the segmented tokens.

As a result, divided morphemes tagged with parts of speech 202 are outputted as results of the morphemic analysis. These results are important information that can be used to detect and track errors in the machine translation system 102 and to detect problems in the analysis of morphemes. The syntax of morphemes obtained by the morphemic analyzer 210 is analyzed by a syntax analyzer 220, where a syntactic patterns and syntactic attributes lexicon 221 is utilized and a syntax analysis tree for the source language 203 is outputted as an interim result.

Subsequently, a syntax converter 230 converts the syntax analysis tree for the source language 203 into a syntax analysis tree for the target language 204 according to the characteristics of the syntax in the target language, where a conversion patterns lexicon 231 is utilized to produce a syntax analysis tree for the target language 204. A target language generator 240 generates a target language sentence 205 from the syntax analysis tree for the target language 204, where the conjunction patterns and tense patterns in a post-processing patterns lexicon 241 are applied. While the form and scope of the respective interim results 202, 203, 204, 205 may vary with their purpose and use in the explanation with reference to FIG. 2, the present invention uses these interim results as important input information to detect and track errors in the machine translation system 102.

Figure 3:
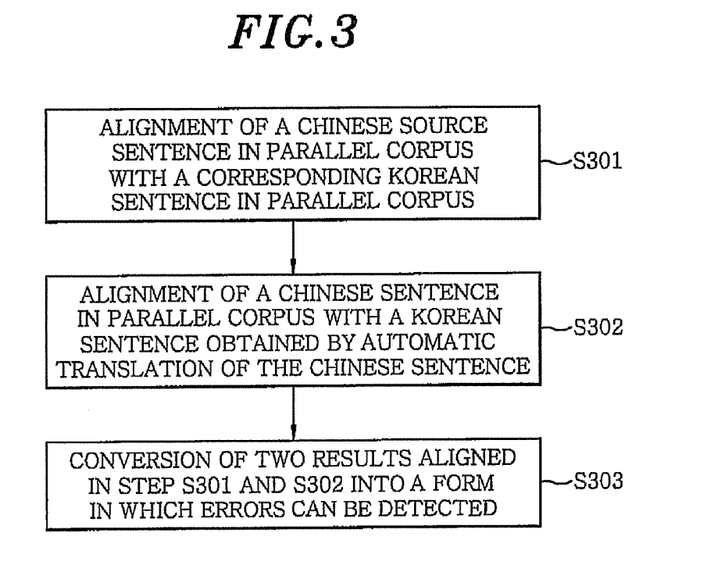
FIG. 3 shows a flow chart of performing alignment by words in accordance with an embodiment of the present invention.

FIG. 3 illustrates a flowchart of performing alignment by words which is crucial operation that uses the interim results from the morphemic analyzer in the machine translation system 102 shown in FIG. 2.

In order to explain in detail the alignment by words, we suppose, hereinafter, that the source language of the present embodiment is Chinese and the corresponding target language is Korean. For the sake of convenience of explanation, the Chinese sentence aligned by words within a parallel corpus is given by "<S snum=3>雖然韓國的技術 競爭力大幅上升, 但是科學競爭力 却連續2年下降. </S>", the corresponding Korean sentence within the parallel corpus is given by "<S snum=3>한국의 기술 경쟁력은 큰 폭으로 상승했지만 과학 경쟁력은 오히려 2년 연속 떨어졌다. </S>" and the Korean sentence that is automatically machine-translated from the Chinese sentence is given by "<S snum=3 한국 기술 경쟁력이 비록 대폭 상승할지라도, 그러나 과학 경쟁력은 오히려 연속 2년 떨어진다. </S>".

It is shown in FIG. 3 that word alignment is carried out in three steps: (i) a step S301 of aligning of the Chinese sentence in the parallel corpus with a corresponding Korean sentence in the parallel corpus, (ii) a step S302 of aligning of the Chinese sentence in the parallel corpus with a Korean sentence obtained by an automatic machine translation of the Chinese sentence, and (iii) a step S303 of decoding the two results aligned in steps S301 and S302 into a form in which errors in the results can be detected.

Figure 4A:
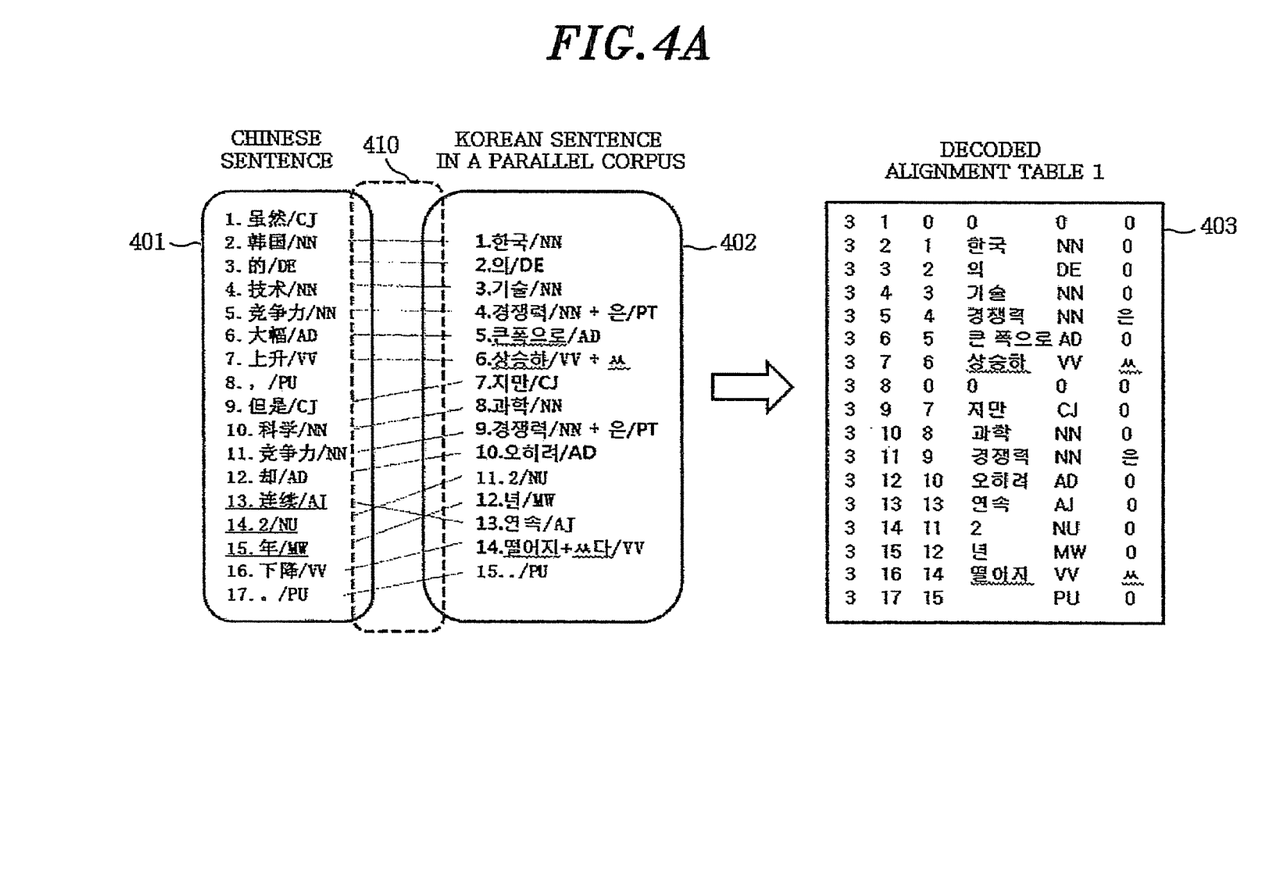
FIG. 4A shows an example of a decoded alignment table of a target language sentence in a parallel corpus in accordance with an embodiment of the present invention.
Figure 4B:
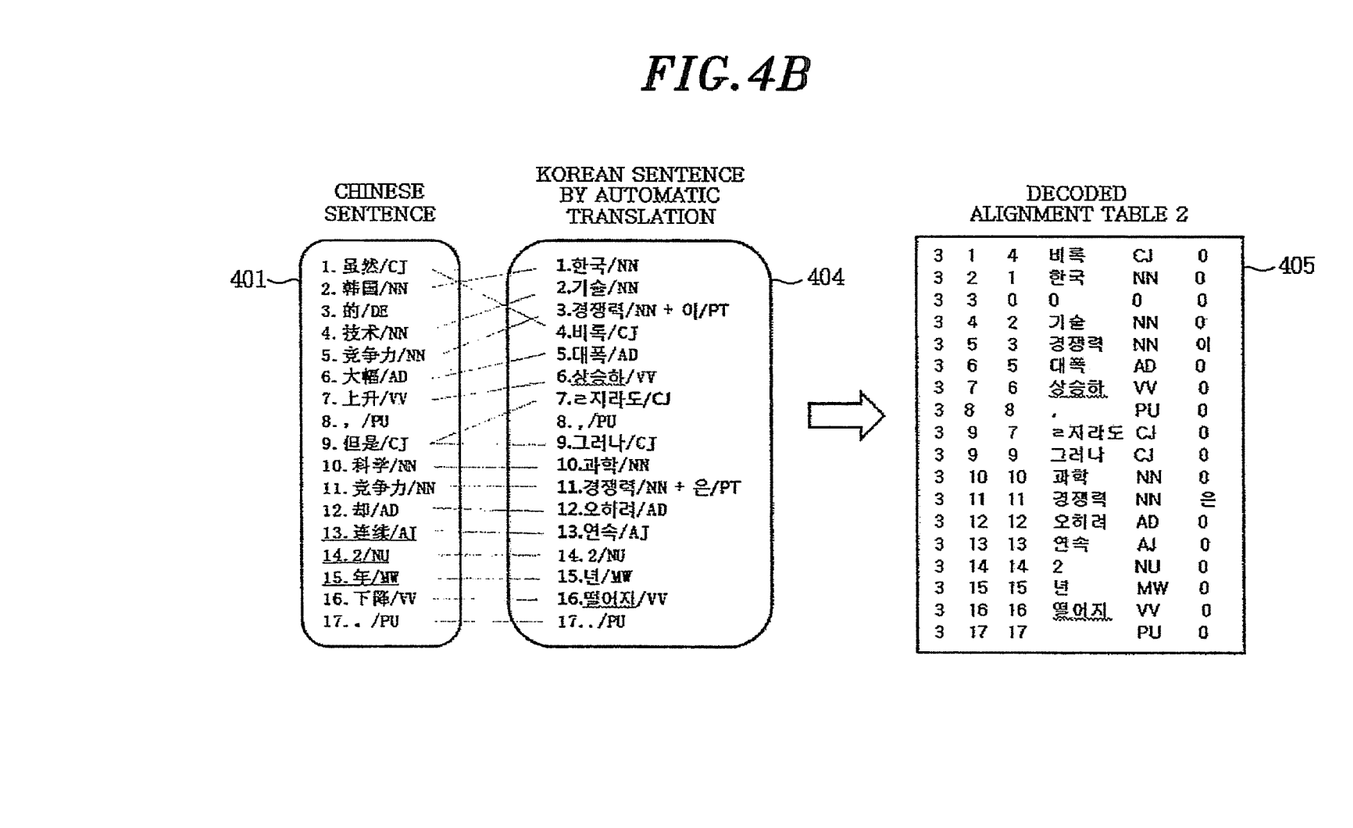
FIG. 4B shows an example of a decoded alignment table of a target language sentence generated by machine translation in accordance with an embodiment of the present invention.

FIG. 4A shows a decoded alignment table between the source language sentence in the parallel corpus and the target language sentence in the parallel corpus, and FIG. 4B shows a decoded alignment table between the source language sentence in the parallel corpus and the machine-translated target language sentence, in accordance with an embodiment of the present invention. Here, the word alignment in the present invention is expanded based on the results of alignment to detect errors.

In FIG. 4A, reference numeral 401 represents the results from the morphemic analysis of the Chinese sentence, i.e. respective tokens and parts of speech corresponding to the respective tokens in pairs with serial numbers, and reference numeral 402 shows the results from the morphemic analysis of the Korean sentence in the parallel corpus, similar to those of the reference numeral 401. When these two lists are aligned using a Chinese-Korea bilingual dictionary, as shown in reference numeral 410, a visible alignment result is obtained. Similarly, the Chinese source language sentence in the parallel corpus and its corresponding Korea target language sentence obtained by automatic machine translation can be aligned, as shown in FIG. 4B, by an identical way as in FIG. 4A.

In FIG. 4B, the reference numeral 405 is the decoded alignment table, which is a result from aligning by words the Chinese source language sentence shown in reference numeral 401 and the machine-translated Korea target language sentence shown in reference numeral 404.

Alignment as in the reference numeral 410 is carried out on a computer by a decoding operation, whose results are tabulated by tables 403 and 405 respectively shown in FIGS. 4A and 4B. Respective columns in tables 403 and 405 are explained in detail as follows.

1) A first column denotes the sentence number of the sentence of interest aligned in the parallel corpus. It can be seen that the result in the present embodiment is for the third sentence within the parallel corpus.

2) A second column shows the sequential numbers for the list of tokens obtained by analysis of morphemes of the Chinese source language sentence. The sequential number starts with 1 for a first token word, since the value 0 is reserved for a token that is not aligned.

3) A third column shows the term numbers obtained by comparing the results from analysis of morphemes of Korea target language sentence with a Chinese-Korean dictionary. The list is non-sequential, because the term numbers are listed by the sequence in the second column. The sequence starts with 1 and the value 0 is assigned for those not aligned, as in the second column.

4) A fourth column shows the list of Korean morphemes that correspond to the respective terms in the second column. The value 0 is assigned for those not aligned, as in the above.

5) A fifth column shows the list of parts of speech corresponding to the respective items in the third column. If an item in the third column is assigned 0, then its corresponding item in the fifth has the same value.

6) A sixth column records suffixes for those nouns and verbs which have suffixes in the third column. In particular, "써" for "떨어졌다" associated with a tense is supposed to be written in this column.

In the following, the usage and purpose of the respective columns in tables 403 and 405 need to be explained.

1) The first column is intended to indicate that the lines in the tables that have an identical number belong to one sentence so as to recognize easily the beginning and end of the sentence.

2) The second column sets a basis to generate the rest of the columns.

3) The third column is for alignment of the target language and also for detecting an inflected phrase pattern error or conjunction pattern error.

4) The fourth column is intended to detect the knowledge errors such as a target word error or engine errors such as a clause division error.

5) The fifth column is for detecting a part of speech tag error.

6) The sixth column is intended to detect a tense error and syntax analysis error.

Hereinafter, operations to detect errors in a machine-translated sentence are explained in detail by reference to FIGS. 4A and 4B.

Detection of errors in the present invention involves detection of knowledge errors such as OOV (out of vocabulary) word extraction, target word error, inflected phrase pattern error and conjunction pattern error and detection of engine errors such as clause division error, syntax analysis error, part of speech tag error and tense error, which commonly take place in the rule-based machine translation system 102. The errors are detected basically by comparing two decoded alignment tables 403 and 405. Here, the comparison is carried out on the basis of the Chinese token number, in a horizontal way and in a vertical way. In the horizontal comparison, the values at the identical sequential number in the second columns of respective tables 403 and 405 are compared, whereas in the vertical comparison, the third columns of the two tables are compared to determine the locations of the values to be compared. In what follows, methods for detecting respective errors are explained in detail.

1. OOV word extraction: Extraction of OOV words is carried out by the horizontal comparison. If there exist a non-trivial value at elements of the fourth column of table 403 but a value is 0 at the corresponding element in table 405 and if the Korean part of speech is tagged with noun, it can be assumed to be an OOV word. This is because there is no corresponding entry in the terminology dictionary used in the machine translation. In this case, the Korean term in table 403 with no corresponding entry may be extracted as a candidate OOV word and provided to the user.

2. Target word error detection: It can be determined to have the target word error if the values at the corresponding locations are not all zero but non-identical. For example, the sixth token of the fourth column in table 403 has a value "큰 폭으로" and that in table 405 has a different value "대폭". Hence, because the respective terms in table 403 is the reference, the term "대폭" in table 405 can be a synonym or the target word error. The accuracy in detection of the target word error is estimated in the error detection phase. If the term tagged with a verb disagrees between tables 403 and 405, there is a high probability of inflected phrase pattern error so that the verb is not considered in case of the target word error.

3. Inflected phrase pattern error detection: This sort of error can be detected by the vertical and horizontal comparison. For example, if the vertical position of the third column of an inflected word "상승하다" in table 405 is different from that in table 403 or in a horizontal comparison it is translated into "떠오르다" with its part of speech being verb, then it can be detected as the inflected phrase pattern error.

4. Conjunction pattern error detection: Because the conjunction pattern error arises primarily by a conjunction, it can be found by the horizontal comparison for a term with its part of speech tag being CJ. For example, the term "지만" in table 403 is translated doubly into "ㄹ지라도" and "그러나" in table 405. Hence, it can be regarded as the conjunction pattern error.

5. Clause division error detection: When the value at a location that corresponds to a term tagged by a symbol ",", it can be regarded as the clause division error.

6. Syntax analysis error detection: This sort of error can be detected by examining the sixth columns of tables 405 and 403, respectively. If the suffixes of corresponding terms in the sixth columns are different, especially the suffix "은/이" is displaced by "을/를", then this can be regarded as the syntax analysis error since the term was analyzed to be the objective case instead of the subjective case.

7. Part of speech tag error detection: If the values at an identical location in the fifth columns of tables 403 and 405 are different, it can be regarded as the part of speech tag error.

8. Tense error detection: This kind of error is limited to verbs. If there exists nontrivial information in the sixth column and they are different from each other, it can be regarded as the tense error.

In order to enhance the accuracy of tracking errors detected in the error detection unit 108, the error analysis unit 110 does not pass the detected errors immediately to the user but store them in the database by types. With the increase of amount of processed sentences in the parallel corpus, the frequency of occurrence of errors increases. When the frequency of each of the detected errors, which is counted by tracking pre-existing errors of the same types, exceeds the critical value, it is then passed to the user as an error. For example, in the case of the target word error, all pre-existing candidate target words are tracked for the same Chinese token and if the frequency of occurrence of the same target words exceeds the critical value, it is regarded as the target word. In the inflected phrase pattern error, because inflected phrase patterns differ slightly even for the same Chinese inflected word depending on which pattern it is applied to, the accuracy of error detection can be improved by tracking the applied pattern in a translation knowledge lexicon of the machine translation system 102, storing the inflected phrase pattern error by error types and examining whether or not it matches to the respective applied patterns.

The errors detected and tracked as described above are classified by the above types in the error analysis unit 110, and the classified errors are stored in the database by types. The candidates are stored with the respective frequency information and aligned in reverse order of the frequency. Classification of errors is not only intended to obtain statistical information on the whole errors but also to enhance the accuracy of the respective errors so that the accurate errors supplied to the user allows us to understand accurately the status of the performance of the present machine translation system.

The present invention allows to automatically detect and track the errors in the rule-based machine translation system by using a massive parallel corpora and hence to locate automatically and easily the errors by making a comparison of the translated result to the reference sentence, without requiring conventional trained bilinguists who spend a great deal of time and efforts on reading through all the translated results to locate errors. Therefore, the present invention is effective not only in significantly reducing the time and efforts required for searching for a great number of errors but also in overcoming the existing limitations that the errors can be located only by bilinguals.

Further, in accordance with the present invention, it is possible to correct the located errors using the target language sentence, that is, the reference sentence, in the parallel corpus, the system engineers can easily improve the problems in the machine translation system in reference to a number of similar errors by classifying the error types and submitting errors with occurrence frequency higher than a given value, and it is effective to resolve the problems that greatly affect the performance of a translation system.

Further, in accordance with present invention, it is possible to save effectively human resources as well as financial and temporal expenses needed to expand the rule-based translation system to a new domain, it is possible to improve effectively the translation system with the introduction of a parallel corpus suited to that domain and it is possible to effectively enhance utility by automatically detecting, tracking and classifying most of errors that can arise in respective operations in the rule-based machine translation system.

While the invention has been shown and described with respect to the embodiments, it will be understood by those skilled in the art that various changes and modifications may be made without departing from the scope of the invention as defined in the following claims.

What is claimed is:

1. A method for automatically detecting errors in machine translation using a parallel corpus, comprising:

analyzing, by a processor, morphemes of a target language sentence in the parallel corpus and a machine-translated target language sentence, corresponding to a source language sentence, to classify the morphemes into words;

aligning by words and decoding, respectively, a group of the source language sentence and the machine-translated target language sentence, and a group of the source language sentence and the target language sentence in the parallel corpus;

classifying by types errors in the machine-translated target language sentence by making a comparison, word by word, between the decoded target language sentence in the parallel corpus and the decoded machine-translated target language sentence; and computing error information in the machine-translated target language sentence by examining a frequency of occurrence of said classified error types, and wherein said classifying the errors by types includes:

decoding by words the target language sentence in the parallel corpus and the machine-translated target language sentence, respectively;

producing respective decoded alignment tables on the basis of the decoded information of the words in the target language sentence in the parallel corpus and the machine-translated target language sentence that match respective words of the source language sentence;

comparing the word information of the target language sentence in the parallel corpus and the machine-translated target language sentence, in the respective decoded alignment tables, to detect errors in the machine-translated target language sentence; and classifying the detected errors by types on the basis of causes of the errors, wherein said classifying the detected errors by types includes searching for words in the decoded alignment tables of the target language sentence in the parallel corpus and the machine-translated target language sentence which match respective words of the source language sentence; and classifying as OOV (out of vocabulary) word error or target word error of the machine-translated target language sentence if the matched word is present in the decoded alignment table of the target language sentence in the parallel corpus in the target language but not in the decoded alignment table of the machine-translated target language sentence, wherein said classifying the detected errors by types includes searching for words in the decoded alignment tables of the target language sentence in the parallel corpus and the machine-translated target language sentence that match respective words of the source language sentence; and classifying as inflected phrase pattern error or conjunction pattern error of the machine-translated target language sentence if alignment sequences of the matched words are inconsistent, wherein said classifying the detected errors by types includes classifying as knowledge error or clause division error of the machine-translated target language sentence if terminology information of respective words in the decoded alignment tables of the target language sentence in the parallel corpus and the machine-translated target language sentence that match respective words of the source language sentence is inconsistent, wherein said classifying the detected errors by types includes classifying as part of speech tag error of the the machine-translated target language sentence if part of speech information of respective words in the decoded alignment tables of the target language sentence in the parallel corpus and the machine-translated target language sentence that match respective words of the source language sentence is inconsistent, wherein said classifying the detected error by types includes classifying as tense error or syntax analysis error of the machine-translated target language if tense information of respective words in the decoded alignment tables of the target language sentence in the parallel corpus and the machine-translated target language sentence that match respective words of the source language sentence is inconsistent.

2. The method of claim 1, wherein the source language is a language being subject to translation.

3. An apparatus for automatically detecting errors in machine translation using a parallel corpus, comprising:

a morphemic analysis unit, of a processor, for analyzing morphemes of a target language sentence in the parallel corpus and a machine-translated target language sentence which correspond to a source language sentence and classifying the morphemes into words;

a word alignment unit for aligning respectively by words and decoding a group of the source language sentence and the machine-translated target language sentence, and a group of the source language sentence and the target language sentence in the parallel corpus;

an error detection unit for detecting errors in the machine-translated target language sentence by making a comparison, word by word, between the decoded target language sentence in the parallel corpus and the decoded machine-translated target language sentence; and an error analysis unit for classifying by types errors in the machine-translated target language sentence detected by the error detection unit and computing error information by examining a frequency of occurrence for each error type, and wherein the error analysis unit decodes by words the target language sentence in the parallel corpus and the machine-translated target language sentence, produces respective decoded alignment tables on the basis of the decoded information of the words in the target language sentence in the parallel corpus and the machine-translated target language sentence that match respective words of the source language sentence, compares the word information of the target language sentence in the parallel corpus and the machine-translated target language sentence, in the respective decoded alignment tables, and classifies errors in the machine-translated target language sentence, wherein the error analysis unit searches for words in the decoded alignment tables of the target language sentence in the parallel corpus and the machine-translated target language sentence which match respective words of the source language sentence, and classifies as OOV word error or target word error of the machine-translated target language sentence if the matched word is present in the decoded alignment table of the target language sentence in the parallel corpus but not in the decoded alignment table of the machine-translated target language sentence, wherein the error analysis unit searches for words in the decoded alignment tables of the target language sentence in the parallel corpus and the machine-translated target language sentence that match respective words of the source language sentence, and classifies as inflected phrase pattern error or conjunction pattern error of the machine-translated target language sentence if alignment sequences of the matched words are inconsistent, wherein the error analysis unit classifies as knowledge error or clause division error of the machine-translated target language sentence, if terminology information of respective words in the decoded alignment tables of the target language sentence in the parallel corpus and the machine-translated target language sentence that match respective words of the source language sentence is inconsistent, wherein the error analysis unit classifies as part of speech tag error of the the machine-translated target language sentence if part of speech information of respective words in the decoded alignment tables of the target language sentence in the parallel corpus and the machine-translated target language sentence that match respective words of the source language sentence is inconsistent, wherein the error analysis unit classifies as tense error or syntax analysis error of the the machine-translated target language if tense information of respective words in the decoded alignment tables of the target language sentence in the parallel corpus and the machine-translated target language sentence that match respective words of the source language sentence is inconsistent.

* * * * *